(12) United States Patent
Krogenes et al.

(10) Patent No.: US 11,013,218 B2
(45) Date of Patent: May 25, 2021

(54) SEA PEN ARRANGEMENT

(71) Applicant: Viewpoint AS, Haugesund (NO)

(72) Inventors: Kåre Olav Krogenes, Haugesund (NO); Kjartan Gilje, Vikeså (NO)

(73) Assignee: Viewpoint AS, Haugesund (NO)

( * ) Notice: Subject to any disclaimer, the term of this patent is extended or adjusted under 35 U.S.C. 154(b) by 290 days.

(21) Appl. No.: 16/300,288

(22) PCT Filed: May 10, 2017

(86) PCT No.: PCT/NO2017/050117
§ 371 (c)(1),
(2) Date: Nov. 9, 2018

(87) PCT Pub. No.: WO2017/196185
PCT Pub. Date: Nov. 16, 2017

(65) Prior Publication Data
US 2019/0150409 A1 May 23, 2019

(30) Foreign Application Priority Data
May 10, 2016 (NO) .................................. 20160781

(51) Int. Cl.
*A01K 61/60* (2017.01)
*A01K 61/10* (2017.01)

(52) U.S. Cl.
CPC .............. *A01K 61/60* (2017.01); *A01K 61/10* (2017.01); *Y02A 40/81* (2018.01)

(58) Field of Classification Search
CPC ........ A01K 61/00; A01K 61/10; A01K 61/60; A01K 61/65; Y02A 40/80; Y02A 40/81;
(Continued)

(56) References Cited

U.S. PATENT DOCUMENTS 2,691,272 A * 10/1954 Townsend ............... E21B 7/136
175/8
4,084,543 A * 4/1978 Pequegnat ........... A01K 29/005
119/200
(Continued)

FOREIGN PATENT DOCUMENTS

EP 0108275 A1 * 5/1984 ........... E02B 17/003
EP 0347489 12/1989
(Continued)

OTHER PUBLICATIONS

Norwegian Search Report, Norwegian Patent Application No. 20160781, date of report Oct. 10, 2016.
(Continued)

*Primary Examiner* — Ebony E Evans
(74) *Attorney, Agent, or Firm* — Andrus Intellectual Property Law, LLP

(57) ABSTRACT

A sea-pen arrangement is for farming fish. The sea-pen arrangement has a service unit with a plurality of shafts projecting downwards and a pontoon at their lower portions. The shafts define an inner area. A net forms a closed enclosure. The sea-pen arrangement further includes at least one sea pen positioned in an outer area on the outside of two shafts. A frame structure has an upper frame with a first fastening portion and a second fastening portion, a bottom frame, and a fence fastened to the upper frame and the bottom frame. The frame structure is fastened to the service unit at the fastening portions, and the frame structure surrounds the at least one sea pen in the outer area.

11 Claims, 4 Drawing Sheets

(58) Field of Classification Search
CPC ......... B63B 35/14; B63B 35/24; B63B 35/26; B63B 35/44
USPC .......... 43/102, 103; 119/207, 208, 211, 215, 119/223–225, 227–229
See application file for complete search history.

(56) References Cited

U.S. PATENT DOCUMENTS

| | | | | | |
|---|---|---|---|---|---|
| 4,259,926 | A | * | 4/1981 | Marliave | A01K 61/90 119/208 |
| 4,350,014 | A | * | 9/1982 | Sanchez | B63B 35/44 60/641.7 |
| 4,609,306 | A | * | 9/1986 | Loire | E02B 17/0021 405/196 |
| 4,716,854 | A | * | 1/1988 | Bourdon | A01K 61/60 119/223 |
| 4,798,169 | A | * | 1/1989 | Rosen | A01K 61/60 119/223 |
| 5,438,958 | A | * | 8/1995 | Ericsson | A01K 61/54 119/223 |
| 5,596,947 | A | * | 1/1997 | Creppel | A01K 61/60 119/223 |
| 5,628,279 | A | | 5/1997 | Bones, IV | |
| 5,651,640 | A | * | 7/1997 | Huete | B63B 21/50 166/350 |
| 5,762,024 | A | * | 6/1998 | Meilahn | A01K 61/60 119/223 |
| 7,644,683 | B2 | * | 1/2010 | Aronowicz | A01K 61/17 119/211 |
| 2004/0123809 | A1 | * | 7/2004 | Klein | A01K 61/60 119/223 |
| 2009/0279958 | A1 | * | 11/2009 | Heidari | B63B 35/44 405/223.1 |

FOREIGN PATENT DOCUMENTS

| | | |
|---|---|---|
| JP | 0253426 | 2/1990 |
| NO | 300921 | 2/1996 |
| WO | 87/04590 | 8/1987 |
| WO | 9009100 | 8/1990 |
| WO | 98/24305 | 6/1998 |
| WO | 2013/006358 | 1/2013 |
| WO | 2013168147 | 11/2013 |

OTHER PUBLICATIONS

International Search Report, PCT/N02017/050117, date of report Jul. 27, 2017.

Written Opinion, PCT/NO2017/050117, date of report Jul. 27, 2017.

* cited by examiner

SEA PEN ARRANGEMENT

CROSS-REFERENCE TO RELATED APPLICATIONS

This application is the U.S. national stage application of International Application PCT/NO2017/050117, filed May 10, 2017, which international application was published on Nov. 16, 2017, International Publication WO 2017/196185 in the English language. The International Application claims priority of Norwegian Patent Application No. 20160781, filed May 10, 2016. The international application and Norwegian application are both incorporated herein by reference, in entirety.

FIELD

The invention relates to a sea-pen arrangement for farming fish. More specifically, the invention relates to a sea-pen arrangement which is suitable for positioning in exposed locations. The invention also relates to the use of a semi-submersible rig of a type which is known from the petroleum industry.

BACKGROUND

The farming of fish, especially salmonoids, has developed from simple and relatively small sea pens with a woodwork frame into large annular sea pens. The annular sea pens are provided with a circular buoyancy body which typically consists of two concentric plastic rings. The plastic rings may carry a walkway. The small sea pens were typically placed in protected coves and round fjords with narrow inlets. As the sea pens grew larger and deeper, the sea pens were placed in locations further from shore. These locations were more exposed to wind and waves.

It is also known that the sea pens may be of a square design and be surrounded by walkways in steel. Even though sea pens with plastic rings or with walkways in steel can stand some waves, they are still placed in locations which are relatively shielded from waves and wind.

To prevent contamination by fish-pathogenic organisms between the fish-farming facilities, there are requirements regarding distance between the facilities. Along a coastline, there are therefore a limited number of locations which satisfy the requirements on shielding and on distance to a neighbouring facility.

There is a risk that a farming facility may be wrecked in bad weather. The fish in the farming facility may then escape. The farmer then suffers a loss in the form of ruined equipment and loss of fish. It is also undesirable to have farmed fish escaping. Escaped farmed salmon, in particular, will seek towards rivers when they become sexually mature and interbreed with the wild population.

Patent document WO 98/24305 discloses an offshore platform resting on a seabed and which is provided with sea pens for farming of fish. The sea pens are connected to the platform with diagonal guy wires, which stretches from the platform to an anchoring on the seabed. The sea pens may be displaced along the wires.

SUMMARY

The invention has for its object to remedy or reduce at least one of the drawbacks of the prior art or at least provide a useful alternative to the prior art.

The object is achieved through the features which are specified in the description below and in the claims that follow.

In a first aspect, the invention relates more specifically to a sea-pen arrangement for farming fish, the sea-pen arrangement comprising:
  a service unit with a plurality of shafts projecting downwards and provided with a pontoon at their lower portions, the shafts defining an inner area; and
  a net forming a closed enclosure,
and the sea-pen arrangement further includes:
  at least one sea pen positioned in an outer area on the outside of two shafts; and
  a frame structure comprising an upper frame with a first fastening portion and a second fastening portion, a bottom frame and a fence fastened to the upper frame and the bottom frame,
the frame structure is fastened to the service unit at the fastening portions, and the frame structure surrounds the at least one sea pen in the outer area.

The frame structure may consist of a skirt which surrounds a portion of an upper portion of the sea pen in the outer area. The frame structure may consist of a structure that seen from above forms a rectangle. The frame structure may surround in full the upper portion of the sea pen. The frame structure may as seen from above form two rectangles or two squares.

The fence may comprise a plurality of substantially vertical beams. The fence may comprise a truss work. The bottom frame may be provided with at least one buoyancy body.

The frame structure may be hingedly attached at each fastening portion to a respective shaft projecting downwards. The frame structure may be hingedly attached at each fastening portion to a respective guide and the guides may each be secured to one of the downward-projecting shafts. The guide may be displaceable along the longitudinal direction of the shaft.

An actuator may be attached to the frame structure and to the shaft, and the actuator may be arranged to generate a fluid flow in a conduit when the frame structure is moving relative to the shaft, and the fluid flow may drive an electric generator. An actuator may be attached to the frame structure and to the guide, and the actuator may be arranged to generate a fluid flow in a conduit when the frame structure is moving relative to the guide, and the fluid flow may drive an electric generator.

The sea-pen arrangement may include at least one sea pen positioned in the inner area.

In a second aspect, the invention relates more specifically to using a semi-submersible rig in a sea-pen arrangement, where at least one sea pen is positioned in an outer area on the outside of the downward projecting shafts of the rig, and a frame structure comprising an upper frame with a first fastening portion and a second fastening portion, a bottom frame and a fence fastened to the frame and the bottom frame, is fastened to the downward projecting shafts in the fastening portions, and the frame structure surrounds the at least one sea pen in the outer area.

BRIEF DESCRIPTION OF THE DRAWINGS

In what follows, an example of a preferred embodiment is described, which is visualized in the accompanying drawings, in which.

DETAILED DESCRIPTION OF THE DRAWINGS

Figure 1:
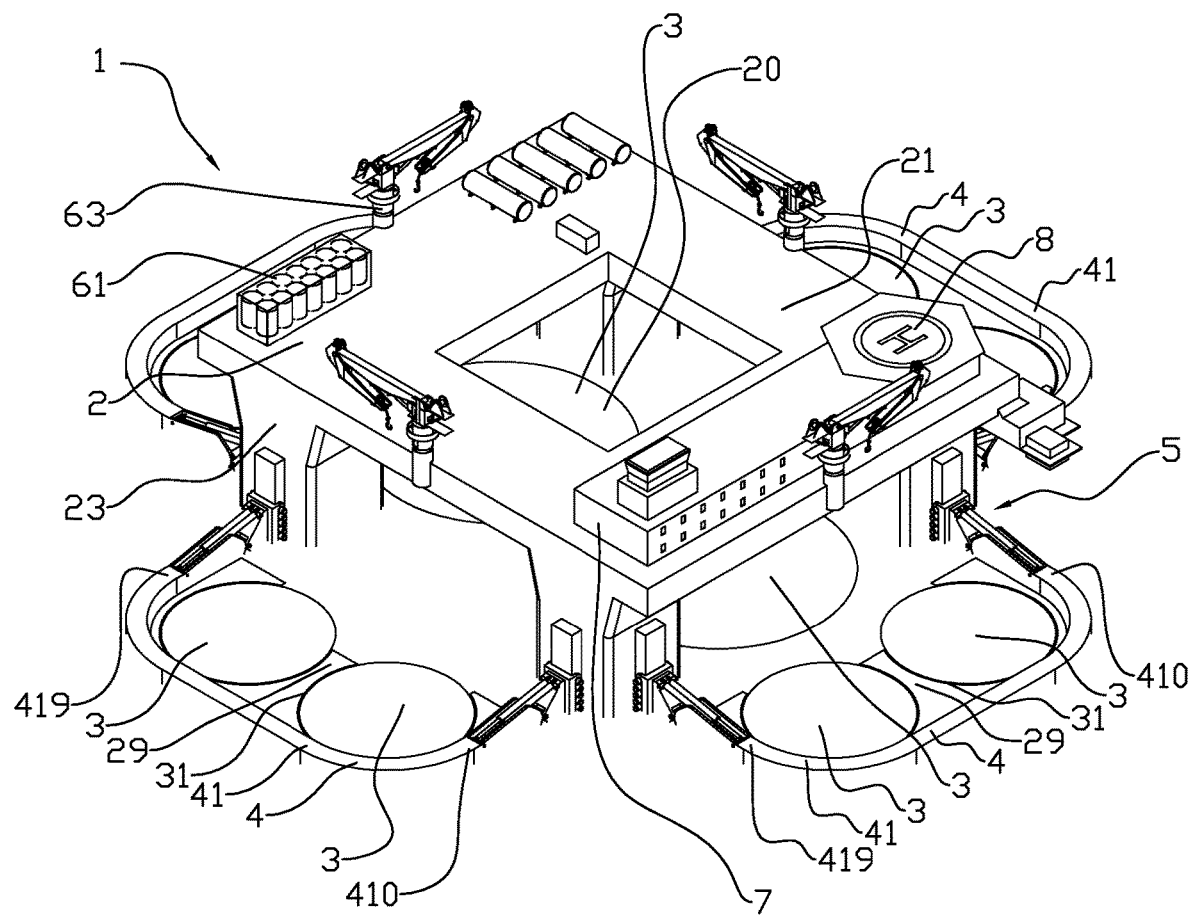
FIG. 1 shows, in perspective, a sea-pen arrangement for farming fish in a first embodiment.
Figure 2:
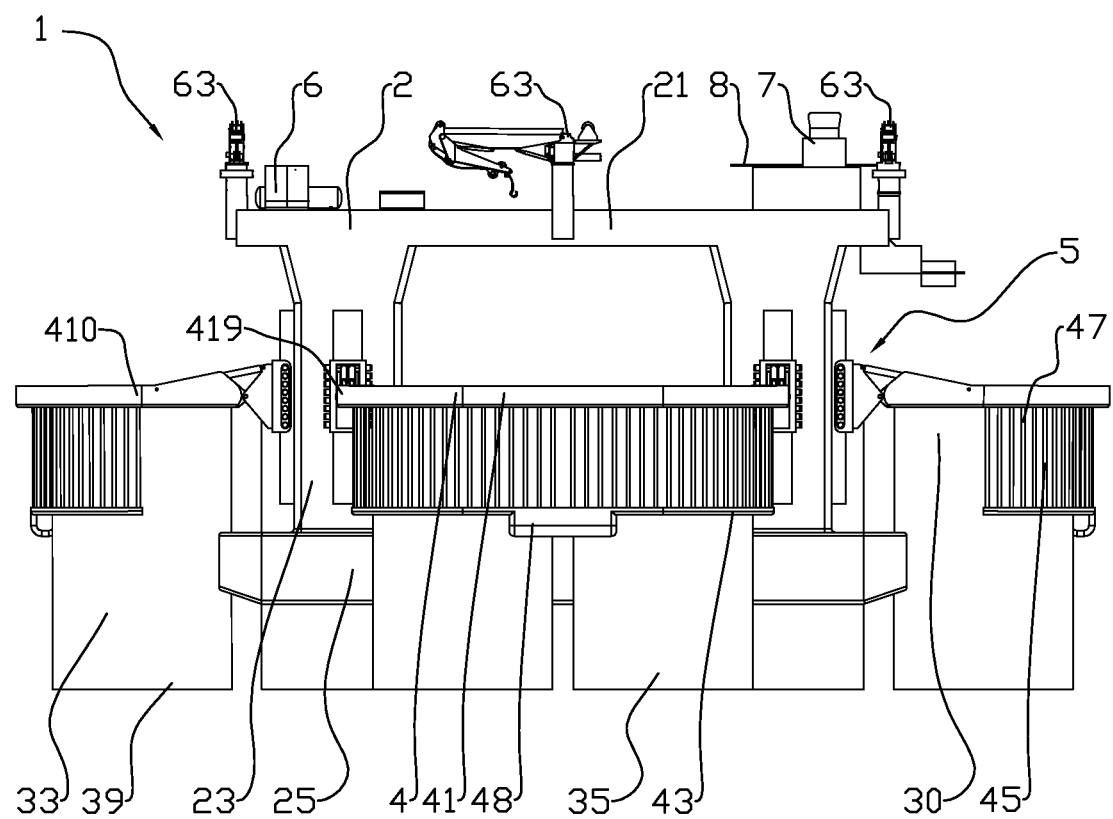
FIG. 2 shows, on another scale, a side view of the sea-pen arrangement.

In the drawings, the reference numeral 1 indicates a sea-pen arrangement according to the invention. The sea-pen arrangement 1 comprises a service unit 2 and a plurality of sea pens 3. In the drawings, the service unit 2 is shown as a semi-submersible rig 21. The sea pen 3 is shown as a circular sea pen. The sea pen 3 includes, among other things, a circular floating body 31 and a net 33 as shown in FIG. 2. The net 3 is secured at its upper portion 30 to the floating body 31. At its lower portion 39, the net 33 is closed, forming a closed enclosure 35 for the farming of fish (not shown).

A semi-submersible rig 21 is known from the petroleum industry. Such a rig 21 may be of several designs. In the figures, a rig 21 with four downward-projecting shafts 23 is shown. The invention is not restricted to such a rig 21. A service unit 2 with, for example, five, six or eight shafts may also be used. At its bottom, each shaft 23 is connected to a pontoon 25 which gives buoyancy to the service unit 2. Each shaft 23 may be provided with a pontoon 25 of its own, or one pontoon 25 may connect two or more shafts 23 as is shown in the figures. The invention is not restricted to a rig 21 that has earlier been used for other purposes, either, as the service unit 2 may be constructed and built especially for use in a sea-pen arrangement 1.

Between themselves, the shafts 23 define an inner area 20. The area surrounding the shafts on the outside of the shafts 23 is an outer area 29.

The service unit 2 includes in a first embodiment at least one rigid frame structure formed as a skirt 4. The frame structure 4 includes a hollow, upper frame 41 surrounding a portion of an upper portion 30 of a sea pen 3. In a first fastening portion 410, the upper frame 41 is attached to a guide 5, and in a second fastening portion 419, the upper frame 41 is attached to another guide 5. The frame structure 4 further includes a bottom frame 43 and a fence 45. The fence 45 is secured, in an upper portion 450, to the upper frame 41 and is secured, in a lower portion 459, to the bottom frame 43. The fence 45 includes a plurality of substantially vertical beams 47 side by side. The beams 47 are distributed between the first fastening portion 410 and the second fastening portion 419 of the upper frame 41. The bottom frame 43 is provided with at least one buoyancy body 48. In the figures, each bottom frame 43 is shown with one buoyancy body 48. The frame structure 4 is positioned in the outer area 29.

Figure 3:
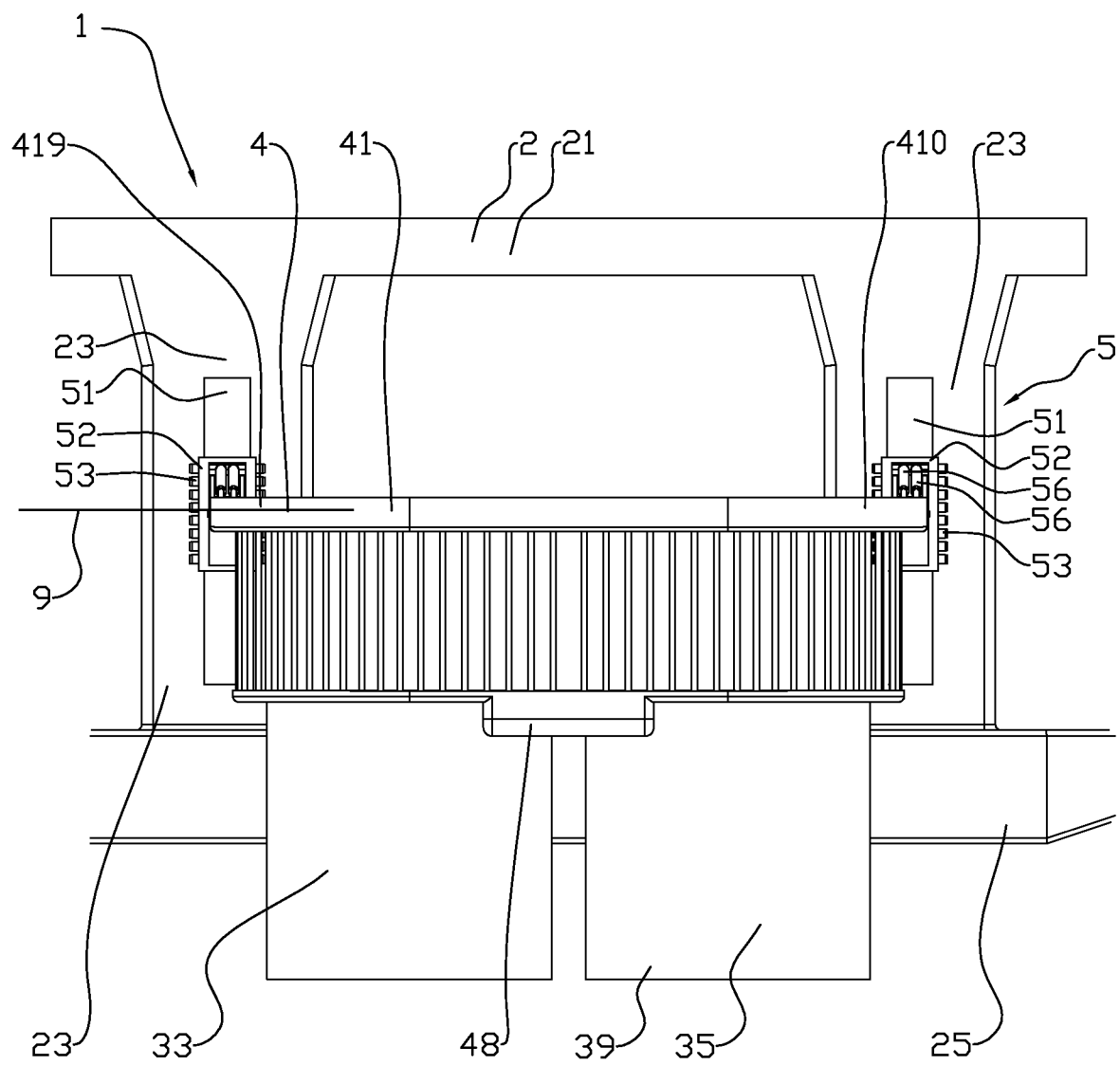
FIG. 3 shows, on a larger scale, a section of FIG. 2.
Figure 4:
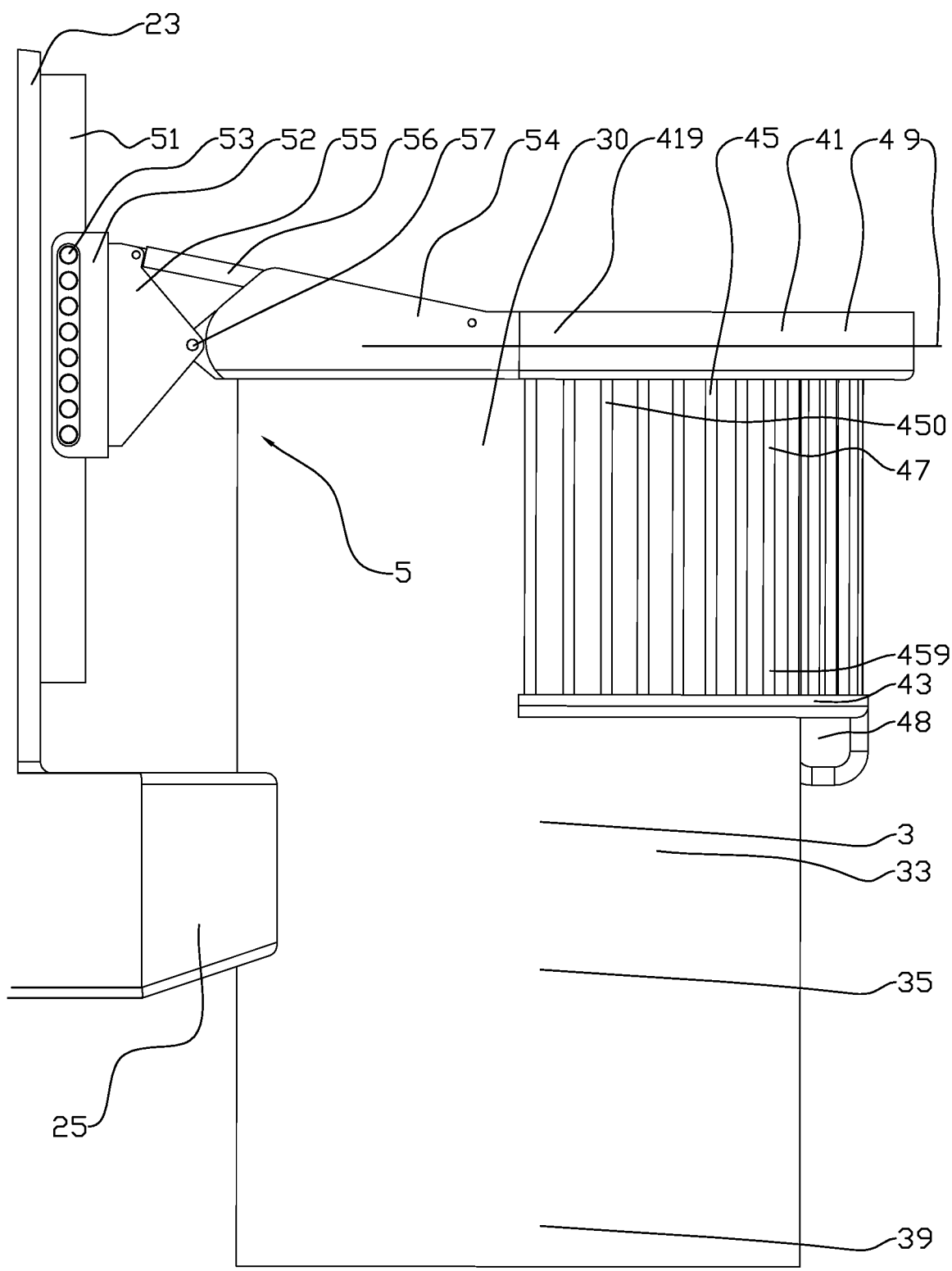
FIG. 4 shows, on an even larger scale, another section of FIG. 2.

The guide 5 includes an elongated guiding element 51 which is fixed to the outside of the shaft 23. The guide 5 further includes a carriage 52 which is arranged to be moved vertically along the guiding element 51 in the longitudinally direction of the guiding element 51. In one embodiment, the guiding element 51 may consist of a pitch rack and the carriage 52 may be provided with a plurality of toothed wheels (not shown) driven by one or more motors 53. The fastening portions 410, 419 of the frame 41 are each hingedly attached to a respective carriage 52 with a respective coupling unit 54. The coupling unit 54 is rigidly connected at one end portion to one fastening portion 410, 419 of the frame 41 and hingedly attached at its opposite fastening portion to a bracket 55 which is fixed to the carriage 52, the bracket 55 projecting from the carriage 52 (see FIG. 4). At least one actuator 56 is attached at one end portion to the carriage 52 and attached at its opposite end portion to the coupling unit 54. The actuator 56 may include a hydraulic cylinder. In the figures, two actuators 56 are shown side by side (see FIG. 3). The actuator 56 is arranged to rotate the coupling unit 54 around a hinge bolt 57.

The service unit 2 can be lifted and lowered relative to the frame structure 4 by the carriage 52 being displaced along the guiding element 51. This may be advantageous because the service unit 2 may be ballasted for lying high in the sea during movement and for lying deep in the sea in normal operating conditions. The service unit 2 may also be lifted to a safety height in bad weather to prevent waves from striking the underside of the service unit 2.

In an alternative embodiment (not shown), the frame 41 is hingedly attached at each fastening portion 410, 419 to a respective shaft 23. The bracket 55 may be directly connected to the shaft 23. The service unit 2 will have the same distance to the water surface 9 when the sea-pen arrangement 1 is being moved and when it is in operation. The shafts 23 have a length that makes the distance between the service unit 2 and the water surface 9 sufficiently large also when the weather is bad.

In the exemplary embodiment shown, a sea-pen system 1 including eight sea pens 3 on the outside of the service unit 2 in the outer area 29 and two sea pens 3 between the shafts 23 of the service unit 2 in the inner area 20 is shown. Each frame structure 4 encircles two sea pens 3. This does not limit the invention as the person skilled in the art will know that other designs are possible by changing the number of shafts 23 and the shape of the pontoon 25, among other things. The sea pens 3 that are positioned on the outside of the service unit 2 in the outer area 29 and encircled by the frame structure 4 may have a diameter of 25 m. The circumference is then approximately 80 m. The sea pens 3 that are positioned between the shafts 23 in the inner area 29 may have a diameter of 40 m. The circumference is then 125 m. The person skilled in the art will know that the sea pens 3 may have other dimensions.

The hollow, upper frame 41 has internal dimensions that make it possible for personnel to move on an inner walkway. For example, the upper frame 41 may have a cross-sectional size of 3.5 m×3.5 m or 4.0×4.0 m or other dimensions. The cross section may have a different geometry from a square cross section. This has the advantage of allowing personnel to move safely to the sea pen 3, sheltered from waves and wind.

The frame structure 4 protects the sea pen 3 from the possibility of a vessel (not shown) inadvertently floating into the sea pen 3 and at worst ruining the sea pen 3. The frame structure 4 also protects against other floating objects (not shown) that might damage the sea pen 3. The upper frame 41 and the fence 45 will work as a wave damper, which gives reduced strain on the sea pen 3 and which is also an advantage to the fish in the sea pen 3.

Together with the submerged part of the frame 41, the buoyancy body 48 may give the frame structure 4 approximately neutral buoyancy in the sea. This reduces the strain on the guide 5 when the sea-pen arrangement 1 is anchored at the location. When the sea-pen arrangement 1 is anchored, the frame structure 4 can follow the wave motions in the water surface 9. The sea pen 3 has its own floating body 31 and can move in the waves independently of the movements of the frame structure 4. The movements of the frame structure 4 can be transmitted to the actuator 56 which passively follows the movements of the frame structure 4. A hydraulic medium, such as a vegetable oil, may be brought to flow in a conduit (not shown) by the movements of the actuator 56. The flowing hydraulic medium may drive an electric generator (not shown).

In an alternative embodiment (not shown) the service unit 2 comprises a frame structure 4 where the frame structure 4 is shaped as a rectangle when seen from above. The frame structure 4 is along one of its sides provided with a first fastening portion 410 and a second fastening portion 419. The frame structure 4 is fastened to the service unit 2 via the fastening portions 410, 419 in the same manner as described above. The frame structure 4 comprises vertical tubular shaped legs which are connected with lower, horizontal tubular shaped beams, also termed lower chords, which together form a bottom frame 43, and upper horizontal tubular shaped beams, also termed upper chords, which together form an upper frame 41. The frame structure further comprises on each side a fence 45 formed as a truss work between the legs, upper chords and lower chords. The frame structure 4 may in a further embodiment be provided with a transverse fence 45 formed as a truss work which divides the frame structure 4 into two equal chambers.

The frame structure 4 may surround one sea pen 3, in which the sea pen 3 is adapted in shape to the frame structure 4. The frame structure 4 may surround two sea pens 3, especially when the frame structure 4 comprises a transverse truss work. The two sea pens 3 are adapted to the frame structure's 4 two chambers.

The frame structure 4 comprises several tubular shaped portions. These may be closed, and the tubular shaped portions will act as buoyancy bodies for the frame structure 4. The frame structure 4 may further be provided with its own buoyancy bodies 48.

The service unit 2 may be provided with silos 61 for feed and an operation module 7 for personnel. The service unit 2 has plenty of room for other necessary equipment for the operation of the sea-pen arrangement 1. The service unit 2 may be provided with necessary hose systems (not shown) for transferring feed and liquids from a service vessel (not shown). Such hose systems are known from the petroleum industry for transferring liquids between a floating or stationary installation and a service vessel. Liquids may be fresh water and fuel. Feed may be transferred from the service vessel by pneumatic conveyance as is known in the trade. The service unit 2 may also be provided with one or more cranes 63 for handling nets 33.

A service unit 2 which has previously been used in the petroleum industry is constructed to withstand considerable loads from waves and wind. A service unit 2 like that is also provided with an anchoring system for the service unit 2 to be stably positioned relative to a seabed (not shown). Such a service unit 2 will also be provided with a helicopter pad 8. This gives increased safety for the personnel as personnel can relatively quickly be evacuated from the service unit 2 in an emergency, such as an accident or acute illness, independently of the weather conditions.

The sea-pen arrangement 1 is towed to the desired location and anchored there.

It should be noted that all the above-mentioned embodiments illustrate the invention, but do not limit it, and persons skilled in the art may construct many alternative embodiments without departing from the scope of the attached claims. In the claims, reference numbers in brackets are not to be regarded as restrictive.

The use of the verb "to comprise" and its different forms does not exclude the presence of elements or steps that are not mentioned in the claims. The indefinite article "a" or "an" before an element does not exclude the presence of several such elements.

The fact that some features are indicated in mutually different dependent claims does not indicate that a combination of these features cannot be used with advantage.

The invention claimed is:

1. A sea-pen arrangement for farming fish, the sea-pen arrangement comprising:
a service unit with a plurality of shafts projecting downwards and provided with a pontoon at their lower portions, the shafts defining an inner area; and
a net forming a closed enclosure,
the sea-pen arrangement further comprising:
at least one sea pen positioned in an outer area on the outside of two shafts; and
a frame structure comprising an upper frame with a first fastening portion and a second fastening portion, a bottom frame and a fence fastened to the upper frame and the bottom frame, the frame structure being fastened to the service unit at the fastening portions, and the frame structure surrounding the at least one sea pen in the outer area.

2. The sea-pen arrangement according to claim 1, wherein the fence comprises a plurality of substantially vertical beams.

3. The sea-pen arrangement according to claim 1, wherein the fence comprises a truss work.

4. The sea-pen arrangement according to claim 1, wherein the bottom frame is provided with at least one buoyancy body.

5. The sea-pen arrangement according to claim 1, wherein the frame structure is hingedly attached at each fastening portion to a respective shaft projecting downwards.

6. The sea-pen arrangement according to claim 5, wherein an actuator is attached to the frame structure and to the shaft, and wherein the actuator is arranged to generate a fluid flow when the frame structure is moving relative to the shaft and the fluid flow may drive an electric generator.

7. The sea-pen arrangement according to claim 1, wherein the frame structure is hingedly attached at each fastening portion to a respective guide, each guide being secured to one of the downward-projecting shafts.

8. The sea-pen arrangement according to claim 7, wherein the guide is displaceable along the longitudinal direction of the shaft.

9. The sea-pen arrangement according to claim 7, wherein an actuator is attached to the frame structure and to the guide, and wherein the actuator is arranged to generate a fluid flow when the frame structure is moving relative to the guide and the fluid flow may drive an electric generator.

10. The sea-pen arrangement according to claim 1, wherein the sea-pen arrangement has at least one sea pen positioned in the inner area.

11. A method of assembling a semi-submersible rig and a sea-pen arrangement, the method comprising:
positioning at least one sea pen in an outer area on an outside of downward-projecting shafts of the rig,
providing a frame structure comprising an upper frame with a first fastening portion and a second fastening portion, a bottom frame, and a fence fastened to the upper frame and lower frame, and
fastening the first fastening portion and second fastening portion to the downward projecting shafts of the rig such that the frame structure surrounds the at least one sea pen in the outer area.

* * * * *